Aug. 28, 1923.

A. KINGSBURY 1,465,988

METHOD OF MAKING PRESSURE DISTRIBUTING STRUCTURES

Original Filed Jan. 23, 1918   2 Sheets—Sheet 1

Inventor
Albert Kingsbury
By Mauro, Cameron, Lewis & Kerkam
Attorneys

Aug. 28, 1923.
A. KINGSBURY
METHOD OF MAKING PRESSURE DISTRIBUTING STRUCTURES
Original Filed Jan. 23, 1918    2 Sheets-Sheet 2
1,465,988
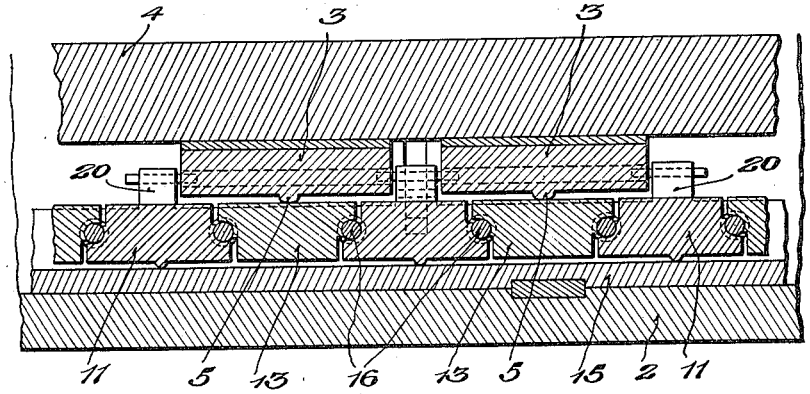
Fig. 4.
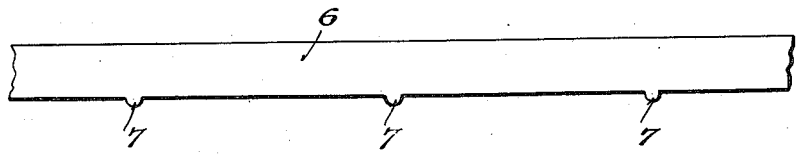
Fig. 5.
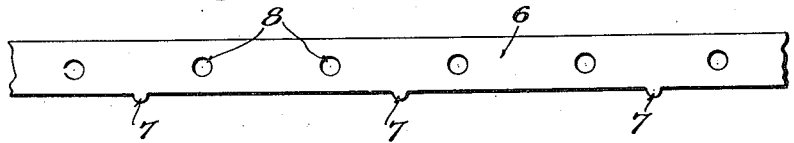
Fig. 6.
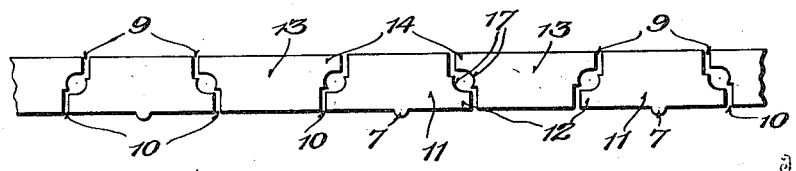
Fig. 7.
Fig. 8.
Inventor
Albert Kingsbury
By Mauro, Cameron, Lewis & Kerkam
Attorneys Patented Aug. 28, 1923.

1,465,988

UNITED STATES PATENT OFFICE.

ALBERT KINGSBURY, OF PITTSBURGH, PENNSYLVANIA.

METHOD OF MAKING PRESSURE-DISTRIBUTING STRUCTURES.

Original application filed January 23, 1918, Serial No. 213,287. Divided and this application filed February 25, 1921. Serial No. 447,693.

*To all whom it may concern:*

Be it known that I, ALBERT KINGSBURY, a citizen of the United States, and a resident of Pittsburgh, Pennsylvania, have invented new and useful Improvements in Methods of Making Pressure-Distributing Structures, which invention is fully set forth in the following specification.

This invention relates to methods of making pressure-distributing structures for bearings and especially bearings of the type wherein bearing segments are so constructed and mounted as to be capable of flexing or tilting automatically in response to the wedging action of the lubricant between the bearing surfaces.

An object of this invention is to provide a simple and effective method of manufacturing a pressure-distributing or equalizing structure for bearings of the type above characterized, which method shall be economical of material and materially reduce the cost of manufacturing equalizing structures of the general type disclosed in my Patent No. 1,361,073, granted Dec. 7, 1920.

The invention is capable of being carried out in a variety of ways, one of which is illustrated on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters designate corresponding parts in the several figures:—

Fig. 4 is a sectional view, taken on the line 4—4 of Fig. 1, developed into a single plane and drawn to a larger scale;

Figs. 5, 6 and 7 are views illustrating successive steps in a method of manufacturing a pressure-distributing structure embodying the present invention; and Fig. 8 shows a fragment of a blank with projections on both surfaces.

Figure 1:
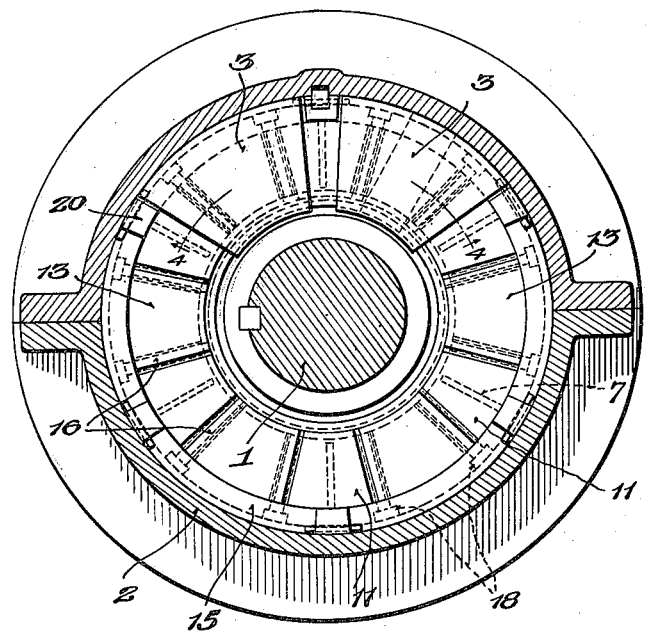
Fig. 1 is a transverse sectional view, partly in elevation, of a bearing employing pressure-distributing means constructed in accordance with the present invention.
Figure 2:
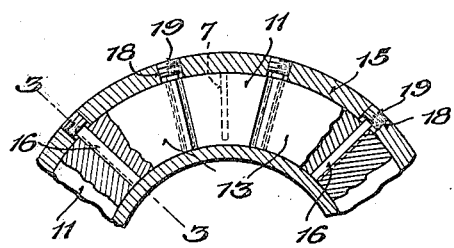
Fig. 2 is a sectional detail of the pressure-distributing means.
Figure 3:
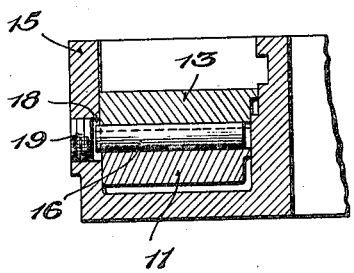
Fig. 3 is a transverse section, on an enlarged scale, on the line 3—3 of Fig. 2.

In the form shown, (as shown in dotted lines in Fig. 5) the bearing for shaft 1 is mounted in a housing 2 of any suitable construction and comprises a plurality of bearing segments or shoes 3 of any suitable construction adapted to engage an opposed bearing surface 4, said bearing segments or shoes being tiltably mounted in any suitable way, as by spherical or radial projections 5, on the pressure-distributing or equalizing structure with which the present invention is more particularly concerned.

In accordance with the present invention, said pressure-distributing or equalizing structure is made from a unitary member, which will ordinarily be of curved or ring-shaped formation to provide a series of equalizing plates adapted to coact with a series of annularly arranged bearing segments. Such a member is diagrammatically illustrated at 6 and, in order to provide pivotal supports for the equalizing plates to be formed from said member, the latter may be provided with a plurality of spaced projections 7 on its lower face to constitute rocking or tilting bearing surfaces. If desired, said member 6 may also be provided with corresponding projections on its upper face, as shown in Fig. 8 by the projections 7′ positioned intermediate the projections 7 on member 6′ to provide rocking or tilting bearing surfaces for the segments 3, to take the place of the heretofore-described projections 5.

A plurality of radial holes 8 are first drilled or otherwise suitably formed in the member 6 at substantially equal intervals which are determined by the desired number and size of the equalizing plates that are to form the parts of the complete structure. The member is next radially slotted or cut at 9 and 10 on its opposite faces, said slots or cuts being so positioned that they break into the holes 8 and divide said member into a plurality of plates which, if said member be of curved or ring-shaped formation, are of generally sector-shaped formation. In the form shown, the cuts or slots 10 in the lower face of the member 6 and at the respective sides of each of the projections 7 are separated as far as it is possible to separate them and still have them break into the holes 8. On the other hand, the cuts or slots 9 on the opposite side of the member 6 break into each of said holes 8 on the opposite side of the same. In this way the member 6 is divided into a plurality of equalizing plates 11, each having a pivotal supporting projection 7 and projections 12 at the opposite ends of the same, and a plurality of bridging plates 13, each having overhanging projections 14 at its opposite ends which are adapted to be disposed in overlapping relation with the projections 12 on the plates 11, so that each of said plates 13 is adapted to bridge the adjacent ends of a pair of plates 11.

This series of overlapping equalizing plates 11 and 13 may be mounted on a base or supporting structure of any suitable form. In the construction illustrated, said over-lapping series of equalizing plates 11 and 13 is mounted in a channel-shaped base ring 15 with interposed, preferably anti-friction, means between the overlapping ends 14 and 12 of said series of plates. Any suitable anti-friction means may be employed, that illustrated comprising rolling bearing members in the form of pins 16, which preferably have a loose fit in the holes 8 while the bearing surfaces 17 formed by the sides of said holes embrace and coact with said rolling bearing members.

To retain the plates 11 and 13 in position the pins 16 may be made a little longer than the plates are wide so that they will extend loosely in to holes 18 suitably provided in the outer wall of the channel-shaped base ring 15. The outer end of said holes 18 may be closed in any suitable way to prevent said pins working out, as by plugs 19 screwed into said holes. It is to be expressly understood, however, that the rollers constituted by said pins 16 are intended to be only illustrative of any suitable rolling bearing members and, for example, they may be replaced by one or more balls or the like, in which event independent means may be used for holding the plates in position. In the form shown, the pins 16 are of slightly smaller diameter than the holes 8 and act as rolling bearing connections between the adjacent ends of the assembled plates, thereby securing great flexibility and ease of movement between the coacting elements of the divided equalizing structure. While said pins 16 serve to hold the plates in position, they do not interefere with the tilting or rocking of the plates incident to the automatic equalization or equitable distribution of the bearing pressure among the several bearing segments or shoes, because they fit loosely into the holes 18.

The bearing segments or shoes 3 may be held in proper position relatively to each other in any suitable way. In the form shown, lugs 20 are suitable attached to the housing 2 and extend inwardly between the edges of adjacent shoes.

It will therefore be perceived that a pressure-distributing or equalizing structure has been provided which requires only relatively simple machining operations, such as drilling and sawing, and whereby a complete system of equalizer plates may be formed from a single member of any suitable shape without waste of material. At the same time, the pins or rollers between the plates are a particularly effective and simple means of accomplishing the joint purpose of providing a rolling or anti-friction bearing between the parts of the equalizing structure and of holding the parts loosely in position.

When the equalizing structure, and the bearing segments or shoes supported thereon, are subjected to end thrust, the individual elements 11 and 13 of the divided ring structure flex or tilt longitudinally or circumferentially in such a manner as to automatically equalize or equitably distribute the thrust pressure on all of said bearing segments. In this action the divided equalizing structure acts in precisely the same manner as the original member 6 would do if the latter was made thin and pliant. The division of said member into a series of relatively short plates and the flexible interconnection of these plates at their overlapping adjacent ends permits the desired longitudinal flexibility to be attained without any reduction in the cross section of the member 6 itself. If the pins 16 fit tightly in the apertures provided between the overlapping ends of the plates 11 and 13, the relative movement between said plates and said pins will be one of sliding only; but if said pins fit loosely in said apertures the relative rocking movement of said plates is accompanied by a rolling motion between the end portions of the same and said pins or such other rolling means as are interposed therebetween. Thus, the interposition of the rolling bearing members between the interconnected overlapping ends of the equalizing structure reduces the resistance to relative movement between the said parts and thereby contributes to the attainment of the greatest possible longitudinal or circumferential flexibility of the ring as a whole. Moreover, if the pins 16 fit tightly in the apertures provided between the overlapping ends of the plates 11 and 13, the relative rocking of said plates will cause a circumferential straining of the system as the lines of interconnection between said plates move to one side or the other of the plane in which they are normally disposed; but if said pins fit loosely in said apertures sufficient relative movement is permitted to enable the plates to rock relatively without straining the system circumferentially. But the members 11 and 13 which are cut from the unitary member 6, together with the anti-friction members, constitute, when they are assembled in position and subjected to transverse pressure, in effect and in action a substantially continuous equalizing structure which performs the same functions in equitably distributing the pressure on the several bearing segments or shoes co-acting therewith as would be performed in a somewhat lesser degree and with somewhat less efficiency by a longitudinally flexible integral member correspondingly mounted on the base ring 15.

While the embodiment of the invention illustrated on the drawings has been described with considerable particularity, it is to be expressly understood that the invention is not limited thereto, as the same is capable of being carried out in a variety of ways and, particularly as respects the nature of the connections between the plates of the pressure-distributing structure, is capable of receiving a variety of mechanical expressions. Certain features may be used without other features thereof and changes may also be made in the details of construction, arrangement and location of parts without departing from the spirit of this invention. Reference is therefore to be had to the claims hereto appended for a definition of the limits of said invention.

This application is a division of my prior application Sr. No. 213,287, filed January 23, 1918.

What is claimed is:—

1. A method of making an equalizing structure for thrust bearings that comprises forming radial holes in a ring and dividing the ring into plates by cuts disposed tangentially to said holes on opposite sides thereof.

2. A method of making an equalizing structure for thrust bearings that comprises forming radial holes in a ring, dividing the ring into plates by cuts that break into said holes, and interposing connecting means between said plates in the openings provided by said holes.

3. A method of making an equalizing structure for thrust bearings that comprises forming radial holes in a ring, dividing the ring into plates with overlapped ends by cuts that break into said holes, and interposing antifriction means between the overlapping ends of said plates.

4. A method of making a pressure-distributing structure for bearings that comprises forming holes in a member and cutting to opposite sides of each hole from opposite sides of said member.

5. A method of making a pressure-distributing structure for bearings that comprises forming holes in a member and forming from said member plates each of which has oppositely-extending projections at its ends by cutting to opposite sides of each hole from opposite sides of said member.

6. A method of forming an equalizing structure for thrust bearings that comprises forming radial holes in a plate-like member, and making radial cuts in opposed surfaces of said member so disposed with respect to said holes as to divide said member into plates with lapped joints.

7. A method of forming an equalizing structure for bearings that comprises forming holes in a ring, and making cuts to said holes in opposed surfaces of said ring to divide said ring into plates.

8. A method of forming an equalizing structure for thrust bearings that comprises forming radial holes in a ring, and dividing said ring at said holes into sector-shaped plates with lapped joints.

9. A method of forming an equalizing structure for thrust bearings that comprises forming radial holes in a ring, and dividing the ring into plates with lapped joints by making radial cuts breaking into the holes, the cuts for each plate being at the near sides of the holes on one side of the plate and at the far sides of the holes on the opposite side of the plate.

10. A method of forming an equalizing structure for thrust bearings that comprises making a member with spaced radial ribs on one or both surfaces to constitute pivotal supports, forming radial holes in the member between said ribs, and cutting into the holes to divide the member into plates.

11. A method of forming an equalizing structure for thrust bearings that comprises making a member with spaced radial ribs on one or both surfaces to constitute pivotal supports, forming radial holes in the member between said ribs, and so dividing the member at the holes as to form plates with lapped edges.

12. A method of forming an equalizing structure for bearings that comprises forming holes in a ring, and dividing the ring at the holes to form plates with bearing surfaces, formed by the walls of said holes, adapted to receive rolling bearing members.

13. A method of forming an equalizing structure for bearings that comprises forming holes in a ring, and cutting to opposite sides of each hole from opposite sides of the ring to form plates having overlapped bearing surfaces, formed by the walls of said holes, adapted to receive rolling bearing members.

14. A method of making a pressure-distributing structure for thrust bearings that comprises forming radial holes in a member and cutting to said holes from opposite sides of said member to form a plurality of plates.

15. A method of making a pressure-distributing structure for thrust bearings that comprises forming radial holes in a curved member and dividing said member into sector-shaped plates by cuts which break into said holes.

16. A method of making a pressure-distributing structure for thrust bearings that comprises forming radial holes in a curved member and dividing said member into plates with over-lapping ends by cutting to opposite sides of each hole from opposite sides of said member.

17. A method of making a pressure-distributing structure for thrust bearings that comprises forming radial holes in a member, cutting to said holes from opposite sides of said member to form a plurality of plates, and interposing rolling-bearing members between said plates.

18. A method of making a pressure-distributing structure for thrust bearings that comprises forming radial holes in a member, cutting to said holes from opposite sides of said member to form a plurality of plates having overlapped ends, and interposing loosely-fitting cylindrical members in the apertures between said overlapping ends.

In testimony whereof I have signed this specification.

ALBERT KINGSBURY.